United States Patent [19]

Fau et al.

[11] 4,404,348
[45] Sep. 13, 1983

[54] SOLVENTLESS ORGANOSILICON COATING/IMPREGNATING COMPOSITIONS

[75] Inventors: Alain Fau, Tassin la Demi-Lune; Parasko Nicou, Francheville, both of France

[73] Assignee: Rhone-Poulenc Specialites Chimiques, Courbevoie, France

[21] Appl. No.: 406,991

[22] Filed: Aug. 10, 1982

[30] Foreign Application Priority Data

Aug. 12, 1981 [FR] France .................................. 81 15787

[51] Int. Cl.$^3$ .............................................. C08G 77/06
[52] U.S. Cl. ..................................... 528/15; 428/443; 428/451; 428/452; 428/447; 528/17; 528/901
[58] Field of Search ................... 528/15, 17, 901, 33, 528/34; 428/443, 451, 452, 447

[56] References Cited

U.S. PATENT DOCUMENTS

3,957,704 5/1976 Smith et al. ............................ 528/17
4,239,877 12/1980 Roedel .................................. 528/15

Primary Examiner—Melvyn I. Marquis
Attorney, Agent, or Firm—Burns, Doane, Swecker & Mathis

[57] ABSTRACT

Solventless organopolysiloxane compositions are well adopted as coating/impregnating materials for a wide variety of substrates to provide, e.g., water repellant-/solvent resistant gaskets and various substrates possessing enhanced non-stick characteristics, are comprised of (i) an $\alpha,\omega$-dihydroxypolydiorganopolysiloxane having a viscosity, measured at 25° C., ranging from 5 to 100,000 mPa.s and consisting essentially of recurring units of the formula $Z_2SiO$ (ii) a polyorganopolysiloxane having from 1.60 to 1.90 organic radicals per silicon atom, having a viscosity ranging from 30 mPa.s at 25° C. to 3,000 mPa.s at 25° C., having from 0.2 to 10% of hydroxyl groups and consisting essentially of the recurring units $RSiO_{1.5}$, $R_2SiO$ and $R_3SiO_{0.5}$ (iii) a crosslinking agent containing a polyalkoxysilyl group; and (iv) a catalytically effective amount of an organic iron or zirconium catalyst soluble in the organopolysiloxane medium.

16 Claims, No Drawings

SOLVENTLESS ORGANOSILICON COATING/IMPREGNATING COMPOSITIONS

BACKGROUND OF THE INVENTION

1. Field of the Invention

The present invention relates to solventless organosilicon compositions comprising at least one organopolysiloxane compound containing a hyroxysilyl group and a crosslinking agent containing alkoxysilyl groups. The subject compositions are especially useful for imparting water-repellant properties to a variety of substrates, such as asbestos or cellulose derivatives or various synthetic materials. Such compositions are also useful for imparting good non- or anti-stick properties to various substrates. The compositions according to the invention thus pave the way for the manufacture of non-stick paper coatings and also gaskets for a variety of industries, such as the automotive industry.

2. Description of the Prior Art

Solventless organosilicon compositions have to date been proposed to this art for the treatment of various substrates, such as paper and plastic sheet materials; these compositions typically comprise low-viscosity diorganopolysiloxanes comprising hydroxyl radicals at the ends of the polymer chain, and vinyl radicals, organohydrogenopolysiloxanes optionally comprising vinyl groups, and catalysts based on platinum or platinum derivatives (compare published French Application No. 2,283,934 and its first Addition thereto No. 2,318,204, and published French Applications Nos. 2,183,125, 2,209,607, 2,294,765 and 2,307,025). Same harden rapidly on the surface of the materials onto which they have been deposited in thin layers, and form coatings frequently having satisfactory non-stick properties.

These compositions have the advantage over those employed in solution, which are usually diluted to at least 5 times their weight with solvent (published French Application No. 2,273,835), of avoiding the setting-up of solvent-recovery equipment, which is sometimes dangerous and always expensive and bulky. However, the coatings obtained are limited as regards their utilization, and their use for the protection of foodstuffs has not hitherto been universally permitted by various national laws. Furthermore, inhibition phenomena have been observed, in particular in respect of metal derivatives contained in the materials to be treated. This last feature is of great importance in the manufacture of gaskets for the automotive industry.

The use of organic tin salts as catalysts for solventless compositions containing diorganopolysiloxanes blocked by hydroxyl radicals at the ends of the polymer chains, and organohydrogenopolysiloxanes (published French Application No. 2,291,254), does not bring about the desired improvements. In fact, these salts firstly have considerable toxicity and, secondly, tend to cause the compositions which they catalyze to gel very rapidly, at ambient temperature, when such compositions are placed in the coating tanks of industrial machines.

Various organosilicon compositions too have been proposed for impregnating the core of, or for making coatings on, composite materials comprising, for example, a metal base and coverings therefor of asbestos fibers. In general, these are organosilicon compositions which can be crosslinked when hot, under the action of peroxides, and which make it possible to obtain various gaskets which can be used, in particular, in the automotive industry. However, very thin coatings prove difficult to obtain by this technique. Furthermore, it is difficult to obtain thick gaskets having very good surface properties.

SUMMARY OF THE INVENTION

Accordingly, a major object of the present invention is the provision of means to impart water-repellant and non-stick properties satisfactorily to various substrate materials, such as asbestos and cellulose derivatives or various synthetic derivatives, by employing solventless organosilicon compositions which are stable at ambient temperature and comprise at least one organopolysiloxane containing a hydroxysilyl group and a crosslinking agent containing an alkoxysilyl group.

Briefly, the subject organopolysiloxane compositions comprise:

(i) an $\alpha,\omega$-dihydroxypolydiorganopolysiloxane (polymer A) having a viscosity, measured at 25° C., ranging from 5 to 100,000 mPa.s and consisting essentially of units of the formula $Z_2SiO$, in which the symbols Z, which are identical or different, represent:

(a) alkyl or halogenoalkyl radicals having from 1 to 8 carbon atoms and containing from 1 to 7 chlorine and/or fluorine atoms;

(b) alkenyl radicals having from 2 to 4 carbon atoms;

(c) cycloalkyl or halogenocycloalkyl radicals having from 3 to 8 carbon atoms and containing from 1 to 4 chlorine and/or fluorine atoms;

(d) aryl, alkylaryl and halogenoaryl radicals having from 6 to 8 carbon atoms and containing from 1 to 4 chlorine and/or fluorine atoms; or (e) cyanoalkyl radicals having from 3 to 4 carbon atoms;

(ii) a polyorganopolysiloxane (polymer B) having from 1.60 to 1.90 organic radicals per silicon atom, having a viscosity ranging from 30 mPa.s at 25° C. to 3,000 mPa.s at 25° C. having from 0.2 to 10% of hydroxyl groups and consisting essentially of units selected from among those of the formulae $RSiO_{1.5}$, $R_2SiO$ and $R_3SiO_{0.5}$, in which the symbols R, which are identical or different, represent:

(a') alkyl or halogenoalkyl radicals having from 1 to 8 carbon atoms and containing from 1 to 7 chlorine and/or fluorine atoms;

(b') alkenyl radicals having from 2 to 4 carbon atoms;

(c') cycloalkyl or halogenocycloalkyl radicals having from 3 to 8 carbon atoms and containing from 1 to 4 chlorine and/or fluorine atoms;

(d') aryl, alkylaryl and halogenoalkyl radicals having from 6 to 8 carbon atoms and containing from 1 to 4 chlorine and/or fluorine atoms; or (e') cyanoalkyl radicals having from 3 to 4 carbon atoms;

(iii) a crosslinking agent containing a polyalkoxysilyl group; and (iv) a catalyst; said compositions being characterized in that the catalyst (iv) is an organic iron or zirconium derivative which is soluble in the organopolysiloxane medium.

DETAILED DESCRIPTION OF THE INVENTION

More particularly according to this invention, it has now been found that, by judicious selection of the various constituents of the subject compositions, which will be defined below, such compositions make it possible to obtain papers which can be used in the food industry and which have good non-stick properties, and also gaskets which are based on fibrous materials, such as asbestos and the like, and are particularly noteworthy by virtue of their water-repellant and elastomeric characteristics, their mechanical properties and their resistance to water and hydrocarbons.

More precisely, the catalytic organic iron or zirconium derivatives advantageously are carboxylic acid salts, chelates or organometallic complexes.

Same can be any salts of an aliphatic, cycloaliphatic or aromatic acid typically containing a maximum of 12 carbon atoms. Among the carboxylic acids, representative are acetic acid, propionic acid, benzoic acid, naphthoic acid, and the like.

It is advantageous to use chelates or organic complexes of divalent or trivalent iron, or alternatively chelates and organometallic complexes of zirconium. The organosilicon compositions according to the invention, which contain such catalyst systems, are especially noteworthy in that they display good stability at ambient temperature.

Any chelate or organic complex of iron or zirconium is suitable, provided, of course, that its solubility in the organopolysiloxane medium is not zero.

It is preferred to use, as the catalyst, organometallic complexes of trivalent iron corresponding to the following structural formula:

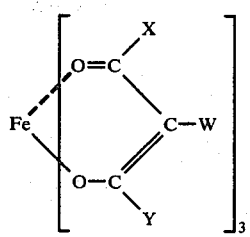

in which the symbol X represents a hydrogen atom, an alkyl radical having from 1 to 4 carbon atoms, such as a methyl, ethyl, n-propyl or n-butyl radical, a phenyl radical, or an alkoxy radical having from 1 to 3 carbon atoms, such as a methoxy, ethoxy or n-propoxy radical, the symbol W represents a hydrogen atom, a methyl radical or an acetyl radical, and the symbol Y represents a methyl radical or a phenyl radical. These complexes are prepared, according to the known processes, by reacting trivalent iron derivatives, in particular ferric chloride, with enolizable compounds selected from among the β-diketones and β-ketoesters.

Examples of β-diketones which are representative are those corresponding to the formulae below:
CH₃—CO—CH₂COCH₃,    CH₃CH₂COCH₂COCH₃,
   CH₃CO—CH—(CH₃)—COCH₃,    CH₃CO—CH-
   (COCH₃)—CO—CH₃ C₆H₅COCH₂COCH₃

Examples of β-ketoesters which are representative are those corresponding to the formulae below:
CH₃CO—CH₂COOCH₃,    CH₃COCH₂COOC₂H₅,
   C₆H₅COCH₂COOC₂H₅, C₆H₅COCH₂COOCH₃

By way of illustration of the iron complexes which are useful within the scope of the present invention, exemplary are those having the structural formulae:

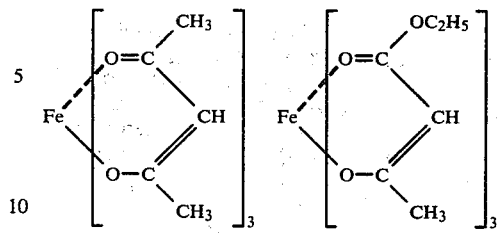

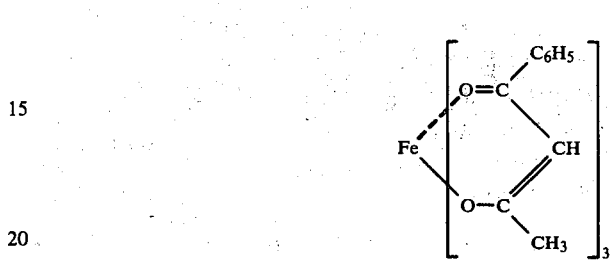

Advantageously, the catalyst is introduced into the organopolysiloxane medium in the form of a solution in an organic solvent which is compatible with the said organopolysiloxane medium. Among such solvents or solvent mixtures, the following are most representative:

(i) the monoethylene glycol derivatives of the formula TO—CH₂CH₂OT, in which the symbols T, which are identical or different, represent radicals of the formula CH₃CO or methyl, ethyl, n-propyl or n-butyl radicals;

(ii) the diethylene glycol derivatives of the formula T'O(CH₂CH₂O)T', in which the symbols T', which are identical or different, represent radicals of the formula CH₃CO or methyl or ethyl radicals (with the proviso that the symbols T' cannot simultaneously represent CH₃CO radicals), the said derivatives being liquid at ambient temperature;

(iii) the aromatic hydrocarbons of the formula:

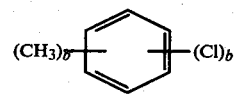

in which the symbol b represents 1 and 2 and the symbol b' represents zero or 1.

The organosilicon compositions according to the invention which contain, as the catalyst system, a chelate or an organic complex of iron or zirconium, in particular the ferric complex:

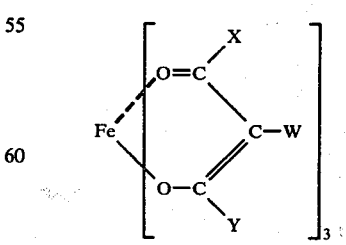

the catalytic entity being introduced into a solvent or a solvent mixture consisting of the monoethylene glycol derivatives, the diethylene glycol derivatives or the aromatic hydrocarbons, such as defined above, constitute a preferred embodiment according to the invention. These compositions are particularly noteworthy by virtue of their very good stability at ambient temperature and by virtue of the good properties which they impart to the various materials defined previously, after impregnation or coating, followed by hardening.

Among the monoethylene glycol derivatives, exemplary are those derivatives having the following formulae:

$CH_3OCH_2CH_2OCH_3$, $CH_3OCH_2CH_2OC_2H_5$, $C_2H_5$—$OCH_2CH_2OC_2H_5$, $n.C_4H_9OCH_2CH_2O_nC_4H_9$, $CH_3COOCH_2OCH_3$, $CH_3COOCH_2CH_2CH_2OC_2H_5$, $CH_3COOCH_2CH_2CH_2O(nC_3H_7)$, $CH_3COOCH_2CH_2OCOCH_3$

Among the diethylene glycol derivatives, exemplary are those derivatives having the following formulae:

$CH_3O(CH_2CH_2O)_2CH_3$, $C_2H_5O(CH_2CH_2O)_2CH_3$, $C_2H_5O(CH_2CH_2O)_2C_2H_5$, $CH_3COO(CH_2CH_2O)CH_3$, $CH_3COO(CH_2CH_2O)_2C_2H_5$.

Among the aromatic hydrocarbons which are liquid at ambient temperature, exemplary are the following hydrocarbons: chlorobenzene, ortho-dichlorobenzene, 2-chloro-1-methylbenzene and 4-chloro-1-methylbenzene.

The diorganopolysiloxane polymers (A) containing hydroxyl end groups are oils or gums having a viscosity ranging from 5 mPa.s at 25° C. to 100,000 mPa.s at 25° C., preferably from 10 mPa.s at 25° C. to 50,000 mPa.s at 25° C.; as above-indicated, same consist essentially of diorganosiloxy recurring units of the formula $Z_2SiO$, but the presence of units of the formula $SiO_2$ and/or $ZSiO_{1.5}$ is not excluded in a proportion of at most 1% of the number of $Z_2SiO$ units.

By way of illustration, the following are representative of the radicals Z:

(1) methyl, ethyl, propyl, isopropyl, butyl, pentyl, hexyl, 2-ethylhexyl, octyl, chloromethyl, dichloromethyl, α-chloroethyl, α,β-dichloroethyl, fluoromethyl, difluoromethyl, α,β-difluoroethyl, 3,3,3-trifluoropropyl, 4,4,4-trifluorobutyl, 4,4,4,3,3-pentafluorobutyl and 3,3,3,4,4,5,5-heptafluoropentyl radicals;

(2) vinyl, allyl and but-2-enyl radicals;

(3) cyclopentyl, cyclohexyl, methylcyclohexyl, 2,3-difluorocyclobutyl and 3,4-difluoro-5-methylcycloheptyl radicals;

(4) phenyl, tolyl, xylyl, chlorophenyl, dichlorophenyl and trichlorophenyl radicals; and (5) β-cyanoethyl and α-cyanopropyl radicals.

To obtain coatings having good non-stick properties, organosilicon compositions will be used in which the α,ω-dihydroxypolydiorganopolysiloxane consists essentially of $Z_2SiO$ units, the symbols Z, which are identical or different, representing methyl, ethyl, n-propyl, vinyl or phenyl radicals; at least 85% of these radicals are methyl radicals, at most 10% of these radicals are phenyl radicals and at most 5% of these radicals are vinyl radicals.

Finally, α,ω-dihydroxypolydimethylpolysiloxane oils are preferably used as polymer (A).

The polymers (A) are widely commercially available from the various silicone manufacturers, and the techniques for their manufacture are well known. One of the commonest techniques consists, in a first stage, of polymerizing diorganocyclopolysiloxanes in the presence of catalytic amounts of alkaline or acid agents, and then in treating the polymers with calculated amounts of water (French Patents Nos. 1,134,005, 1,198,749 and 1,226,745), the amounts of water introduced being the greater, the lower the viscosity of the polymers to be prepared. Then, in a second stage, the polymers are isolated by removing, at a temperature which is generally above 100° C. and under a pressure which is preferably below atmospheric pressure, the starting material diorganocyclopolysiloxanes which equilibrate the reaction, and also the other low molecular weight polymers which are formed during this reaction. Before distilling the volatile products, it is necessary to neutralize the alkaline or acid agents employed as polymerization catalysts.

The organopolysiloxane polymers (B) preferably are branched polymers having from 1.60 to 1.95 organic radicals per silicon atom, preferably 1.65 to 1.90, having a viscosity ranging from 30 mPa.s at 25° C. to 3,000 mPa.s at 25° C., preferably ranging from 40 mPa.s to 2,000 mPa.s at 25° C., and containing from 0.2 to 10% of hydroxyl groups, preferably from 0.5 to 6%. These polymers can be prepared by hydrolyzing mixtures consisting of halogenosilanes selected from among those of the formulae $RSiCl_3$, $R_2SiCl_2$ and $R_3SiCl$; the molar distribution of the halogenosilanes in the mixtures is calculated such as to provide organopolysiloxanes having a ratio R/Si ranging from 1.60 to 1.95. More precisely, mixtures are hydrolyzed which contain the silanes of the formulae $RSiCl_3$ and $R_2SiCl_2$ or of the formulae $RSiCl_3$ and $R_3SiCl$ or of the formulae $RSiCl_3$, $R_2SiCl_2$ and $R_3SiCl$.

The hydrolysis generally takes place at temperatures ranging from 0° C. to 60° C., in a molar excess of water (relative to the number of gram atoms of chlorine bonded to the silicon atom), in the presence or absence of solvents. It can be carried out batchwise, the chlorosilanes and water being introduced simultaneously and separately into a reactor containing a small amount of hydrolysate, or, alternatively, it can be carried out continuously. Preferably, mixtures of methylchlorosilanes are hydrolyzed. After drying, the hydrolysates can be subjected to devolatilization in order to remove the low molecular weight polysiloxanes, and/or rearranged by heating over acid or basic catalysts in order to adjust the hydroxyl number and the viscosity.

To obtain coatings having good non-stick properties, organosilicon compositions are used in which the organopolysiloxane polymer (B) is such that its units correspond to a symbol R representing methyl, ethyl, n-propyl or vinyl radicals, at least 90% of these radicals being methyl radicals and at most 5% of these radicals being vinyl radicals.

The agents containing polyalkoxysilyl groups, which are also designated by the expression "crosslinking agents", and which are also employed within the scope of the present invention, can be a very wide variety of types: they can be any compound containing an alkoxysilyl group, such as polyalkoxysilanes, polyalkoxysiloxanes, polyalkoxypolysiloxanes, silicates or polysilicates, and the like.

The crosslinking agents can be, in particular, monomeric compounds of the formula (II) or (III):

$$R'_aSi[OR'']_{4-a} \quad \text{(II)}$$

$$R'_aSi[(OCH_2—CH_2)_bOR'']_{4-a} \quad \text{(III)}$$

in which formulae the symbol R' represents a methyl, ethyl, n-propyl, vinyl or phenyl radical, the symbol R'' represents a methyl or ethyl radical, the symbol a represents zero or 1 and the symbol b represents 1 or 2.

The crosslinking agents can be disiloxane compounds of polymeric compounds (silicates, polysilicates or polyalkoxypolysiloxanes) resulting from the partial hydrolysis of monomers of the formula $Si(OR'')_4$ and/or $R'Si(OR'')_3$. Difunctional compounds, such as $R'_2Si(OR'')_2$, can obviously be associated with these various monomers during the partial hydrolysis.

It is also possible, within the scope of the present invention, to use a mixture of crosslinking agents of the monomeric or polymeric type.

By way of illustration, the various compounds which follow are representative of the alkoxy crosslinking agents: methyltrimethoxysilane, methyltriethoxysilane, methyltriisopropoxysilane, chloromethyltrimethoxysilane, chloromethyltriethoxysilane, fluoromethyltriethoxysilane, methyl-tris-($\beta$-methoxyethoxy)-silane, ethyltrimethoxysilane, ethyltriethoxysilane, n-propyltrimethoxysilane, n-propyl-tris-($\beta$-methoxyethoxy)-silane, 4,4,4,3,3-pentafluorobutyltrimethoxysilane, hexyltrimethoxysilane, 2-ethylhexyltrimethoxysilane, vinyltrimethoxysilane, vinyltriethoxysilane, allyltrimethoxysilane, but-2-enyl-triethoxysilane, 2,2-dichlorocyclopropyltriethoxysilane, 2,2-difluorocyclopropyltriethoxysilane, cyclopentyltrimethoxysilane, cyclohexyltriethoxysilane, 2,3-dimethylcyclohexyltrimethoxysilane, phenyltrimethoxysilane, phenyl-tris-($\beta$-methoxyethoxy)-silane, trichlorophenyltrimethoxysilane, tetrachlorophenyltriethoxysilane, (chloromethyl)-methyldimethoxysilane, (chloromethyl)-methyldiethoxysilane, dimethyldimethoxysilane, methyl-(n-propyl)-dimethoxysilane, (2,2-dichlorocyclopropyl)-methyldimethoxysilane, (2,2-difluorocyclopropyl)-methyldiethoxysilane, (2,2-dichlorocyclopropyl)-methyldiethoxysilane, (fluoromethyl)-methyldiethoxysilane, (fluoromethyl)-methyldimethoxysilane, methyl silicate, ethyl silicate, propyl silicate, isopropyl silicate, butyl silicate, $\beta$-methoxyethyl silicate, $\beta$-ethoxyethyl silicate, mixed methyl ethyl silicates and mixed methyl butyl silicates.

The polymers which can be obtained by the partial hydrolysis of the silicates of the formula $Si(OR'')_4$ (methyl, ethyl, propyl and butyl silicates and mixed methyl ethyl silicates) are typically designated polysilicates and consist for the major part of units of the formula $OSi(OR'')_2$ and a small proportion of units of the formulae $(R''O)_3SiO_{0.5}$, $R''SiO_{1.5}$ and $SiO_2$. These polymers are usually characterized on the basis of their proportion of alkoxy groups or of silica; they are preferably characterized by their proportion of silica because it is frequently easier to determine the silica (by total hydrolysis of a sample) than the alkoxy groups. The methods for their preparation are well known and are described, in particular, in the work "Chemistry and Technology of Silicones" by W. Noll, pages 648 to 653.

It is preferred to employ crosslinking agents of the formulae:
$Si(OCH_2CH_2OCH_3)_4$, $Si(OCH_2CH_2CH_2OC_2H_5)_4$,
$Si(OCH_2CH_2OCH_2CH_2OCH_3)_4$,
$CH_3Si(OCH_2CH_2OCH_3)_3$,
$CH_3Si(OCH_2CH_2OCH_2CH_2OCH_3)_3$,
$CH_3Si(OCH_2CH_2OC_2H_5)_3$,
$C_2H_5Si(OCH_2CH_2OCH_3)_3$,
$(n.C_3H_7)Si(OCH_2CH_2OCH_3)_3$,
$CH_2=CHSi(OCH_2CH_2OCH_3)_3$,
$CH_2=CHSi(OCH_2CH_2OC_2H_5)_3$,
$CH_2=CHSi(OCH_2CH_2OCH_2CH_2OCH_3)_3$,
$C_6H_5Si(OCH_2CH_2OCH_3)_3$.

The crosslinking agents of the formulae:
$Si(OCH_2CH_2OCH_3)_4$, $CH_3Si(OCH_2CH_2OCH_3)_3$,
$CH_2=CHSi(OCH_2CH_2OCH_3)_3$,
$C_6H_5Si(OCH_2CH_2OCH_3)_3$
are preferably introduced into the compositions of the invention, by themselves or as mixtures.

The various constituents of the compositions according to the invention can be introduced in varying proportions according to the application envisaged. As a general rule, the compositions according to the invention comprise:

(1) 100 parts of the diorganopolysiloxane (A);

(2) 30 to 120 parts of the organopolysiloxane polymer (B);

(3) 8 to 35 parts of crosslinking agent (compound C); and (4) 6 to 40 parts of the catalyst system (compound D) consisting of a solution containing from 1 to 10% weight/weight of an organic iron or zirconium derivative in a solvent which is compatible with the polysiloxane medium.

Aside from the ingredients (A), (B), (C) and (D), other adjuvants can be introduced or incorporated into the subject organosilicon compositions, for example, $\alpha,\omega$-bis-(triorganosiloxy)-diorganopolysiloxane oils having a low viscosity generally ranging from 0.5 to 200 mPa.s at 25° C., which serve to adjust the viscosity of the compositions according to the invention. These oils consist essentially of recurring units of the formula $Z_2SiO$ and are blocked at each end of their polymer chain by units of the formula $Z_3SiO_{0.5}$; the symbols Z, which are identical or different, represent the same radicals as those defined above in the description of the diorganopolysiloxanes (A); moreover, the percentages of methyl, vinyl and phenyl radicals bonded to the silicon atoms of the oils are identical to those assigned, if appropriate, to the corresponding radicals of the diorganopolysiloxanes (A).

The blocking oils are manufactured and are available on an industrial scale. Furthermore, same can be prepared following the procedure described for the manufacture of the diorganopolysiloxane polymers (A), provided, however, that the calculated amounts of water are replaced by calculated amounts of low molecular weight $\alpha,\omega$-bis-(triorganosiloxy)-diorganopolysiloxane chain blockers having at most 10 diorganosiloxy units. Such blockers can correspond, for example, to the formula below:
$(CH_3)_3SiOSi(CH_3)_3$,
$(CH_3)_3Si[OSi(CH_3)_2]_4OSi(CH_3)_3'$,
$CH_2=CHSi(CH_3)_2OSi(CH_3)_2CH=CH_2$.

These oils are introduced in an amount of at most 25 parts, preferably from 4 to 20 parts, per 100 parts of the diorganopolysiloxanes (A). It will be preferred to select the $\alpha,\omega$-bis-(trimethylsiloxy)-dimethylpolysiloxane oils which are very readily commercially available.

Other additives or fillers can also be introduced, in particular agents serving to improve the adhesion of the hardened compositions to various cellulose substrates or synthetic substrates.

Thus, it is recommended to add to the ingredients (A), (B), (C) and (D) epoxysilanes selected from those of the formula:

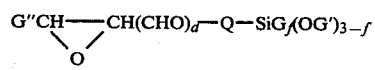

and of the formula:

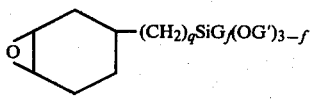

in which formulae the symbol G represents an alkyl group having from 1 to 4 carbon atoms, or a phenyl group; the symbol G' represents an alkyl group having from 1 to 3 carbon atoms, or a methoxyethyl group; the symbol G'' represents a hydrogen atom or an alkyl group having from 1 to 3 carbon atoms; the symbol Q represents an alkylene radical having from 1 to 10 carbon atoms; the symbol f represents 0 or 1; the symbol g represents 0 or 2; and the symbol d represents 0 or 1.

By way of illustration of alkyl radicals having from 1 to 4 carbon atoms, represented by G, exemplary are methyl, ethyl, n-propyl and n-butyl radicals.

By way of illustration of alkyl radicals having from 1 to 3 carbon atoms, represented by G' and G'', exemplary are methyl, ethyl, n-propyl and isopropyl radicals.

By way of illustration of alkylene radicals having from 1 to 10 carbon atoms, represented by Q, exemplary are those of the formulae:

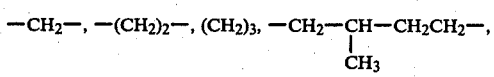

More specifically, these epoxysilanes can correspond to the formulae below, which demonstrate how the various definitions of G, G', G'', Q, d, f and g can be combined:

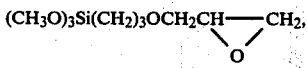

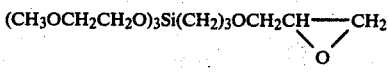

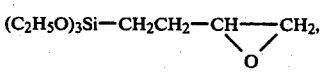

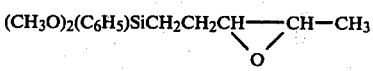

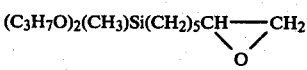

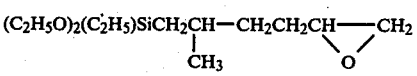

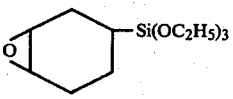

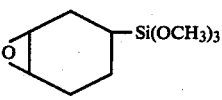

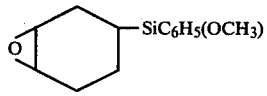

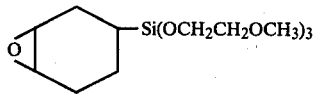

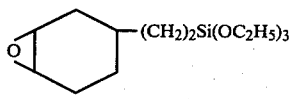

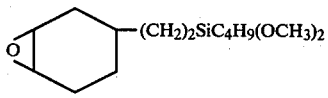

The methods of preparation and the characteristics of these epoxysilanes are described in the chemical literature and more especially in French Patent Nos. 1,185,009, 1,526,291 and 1,548,971. These epoxysilanes are introduced in an amount of at most 8 parts, preferably from 0.1 to 6 parts, per 100 parts of diorganopolysiloxanes (A). It will be preferred to select the epoxysilanes having glycidoxypropyl groups bonded to the silicon atoms (they correspond, for example, to the first two structural formulae shown above), because they are commercially available or are easy to prepare.

The compositions according to the invention can also contain various other ingredients not yet described and which can be used in the chemical art in question. If it is desired to obtain elastomers or coatings, it will be necessary to introduced fillers which will make it possible to improve the various mechanical properties. The fillers can be inorganic or organic.

The inorganic fillers are commonly pyrogenic silicas or precipitated silicas, the physicochemical characteristics of which depend on the use envisaged. The various silicas will have been subjected to a treatment for modifying their surface properties, in particular by making them hydrophobic; the nature of the various agents intended for modifying the surface properties is not critical. The agents used are generally of organosilicon type, such as silazanes (hexamethyldisilazane and the like), alkylsilanes (trimethylsilane and the like), alkylalkoxysilanes (trimethylethoxysilane and the like), alkylchlorosilanes, alkenylchlorosilanes, α,ω-dihydroxyorganopolysiloxanes, cyclosiloxanes and the like, and are described, for example, in French Patent Nos. 2,365,596 and 2,395,952.

Moreover, in addition to the treated silica, the compositions can contain other fillers, such as powdered quartz, diatomaceous earth, talc, carbon black and the like.

Among the organic fillers which can be used, representative are powdered cork, wood sawdust, synthetic fibers, asbestos fibers, cellulosic fibers and the like.

The overall amount of filler obviously depends on the application envisaged. Thus, for the compositions used for the preparation of coatings or gaskets, from 5 to 50% and preferably from 10 to 40% of treated pyrogenic or precipitated silica is generally incorporated.

The compositions according to the invention can be used in applications other than those above-mentioned.

In fact, they make it possible to obtain covering products or coating materials, such as varnishes, paints and the like. In that case, they will contain pigments and, if appropriate, other additives, such as structuring inhibitors, heat stabilizers, thixotropic agents, corrosion inhibitors and the like.

The compositions can be prepared by simply mixing the ingredients (A), (B), (C) and (D) and, if appropriate, the above-mentioned additives, at ambient temperature.

The order in which these ingredients are incorporated is arbitrary, but it is frequently more practical to first mix the polymers (A) and (B), to which the α,ω-bis-(triorganosiloxy)-diorganopolysiloxanes have been added if appropriate, and then to add the crosslinking agents (C), the catalyst systems (D) and, if appropriate, the epoxysilanes.

These compositions, when permitted to stand in containers open to the atmosphere, are stable for at least 15 hours at ambient temperature. They therefore have the advantage of not gelling in the coating tanks feeding the industrial coating machines. Hence, the industrial coating products are greatly facilitated thereby.

For their prolonged storage, however, it is essential to package the compositions in 2 parts which will be mixed before use, it being possible for one of the 2 parts to contain the ingredients (A), (B) and (C) and, if appropriate, the α,ω-bis-(triorganosiloxy)-diorganopolysiloxanes and the epoxysilanes, and for the other to contain the catalyst systems (D). Nevertheless, it may be prudent to incorporate only the polymers (A) and (B), to which the α,ω-bis-(triorganosiloxy)-diorganopolysiloxanes have been added if appropriate, in one of the 2 parts and to include the crosslinking agents (C) and the catalyst systems (D), to which the epoxysilanes have been added if appropriate, in the other part. This method of packaging makes it possible to vary the ratio polymers/crosslinking agents+catalyst systems more easily, as a function of the amounts of polymers which it is desired to deposit on the substrates to be treated.

As above-mentioned, the compositions can be used for coating or impregnating various substrate materials, such as metal materials, cellulosic materials, synthetic materials, materials based on asbestos fibers, and the like.

The compositions used for coating purposes are deposited, for example, with the aid of feeding means, mounted on industrial machines, which make it possible to uniformly spread small amounts of liquid products in a thin layer. Among such devices, advantageously used is that called "Helioglissant", which mainly comprises two superposed cylinders rotating in opposite directions at different speeds, the adjustment of which makes it possible to deposit the desired amounts of the coating compositions: the function of the lower cylinder, dipping into the coating tank filled with composition, is to impregnate the cylinder located above it, and the latter then deposits a uniform layer of composition on the materials to be treated.

Once deposited upon the substrates, the compositions are hardened in a few seconds by moving the substrates through tunnel ovens heated to about 60°–200° C. The time required for passage through these ovens varies from 2 to 30 seconds; for a given length of the ovens, it depends upon the speed at which these coated substrates move and on the hardening temperature. Thus, substrates of cellulosic materials can move at a speed of 200 m/minute with a passage time of 5 seconds through an oven heated to temperatures on the order of 170°–200° C., or at a speed of 100 m/minute with a passage time of 10 seconds through the same oven at a temperature on the order of 120°–160° C.

The amounts of compositions deposited upon the materials to be treated can vary according to the application envisaged, and range, for example, from 0.1 to 4 g/m$^2$ in the case of paper; these amounts depend upon the nature of the materials and on the desired non-stick properties. Thus, the amounts deposited on non-porous substrates (such as very refined papers treated with a barrier layer, and plastic sheets) are small and hardly ever exceed 1.5 g/m$^2$; same are on the order of 0.3 to 1 g/m$^2$. On the other hand, to obtain the same non-stick properties on porous substrates, it is essential to deposit substantially larger amounts, on the order of 1.2 to 2 g/m$^2$ or even more.

The hardened layers of the compositions impart, to the substrates to which they are attached, very good water-repellant properties and, if appropriate, non-stick properties, which are maintained over prolonged periods of time. Furthermore, these hardened layers are very resistant to rubbing; in particular, they are not removed by abrasion during the passage of the coated substrates over the return cylinders of the coating or adhesive-applying machines, these cylinders consisting of materials whose surfaces have a greater or lesser degree of roughness.

The compositions of the invention can thus be applied to any materials which will subsequently be in contact with moisture-releasing substances. These porous or non-porous cellulosic materials or synthetic materials therefore include the different varieties of paper (such as Kraft paper of any degree of refining, crystal paper and sulfurized papers), cardboards, vegetable parchment, papers coated with polyethylene or carboxymethoxycellulose, sheets of regenerated cellulose (such as cellophane) or of polycellulose acetate, plastic sheets, such as polyethylene, polypropylene and polyethylene terephthalate sheets, metal foils, fabrics based on synthetic fibers, glass fibers or asbestos fibers, and nonwoven fibrous materials, whether based on cellulose fibers, synthetic fibers or a mixture of such fibers.

The materials thus rendered non-stick are used as spacers, separating supports, papers and films for transfers, and packaging for moisture-releasing foodstuffs, such as fish, meat and cheese, to sticky foodstuffs, such as confectionery and pastry.

The compositions according to the invention can be used for impregnating various composite materials based on asbestos, cork, cellulosic fibers and synthetic polymer fibers, and the like. They thus pave the way for the manufacture of various gaskets which may be non-stick and which have a good resistance to water and/or hydrocarbons. It will be appreciated that good non-stick properties will be obtained by selecting the organopolysiloxane compositions in accordance with that which has been above outlined.

In order to further illustrate the present invention and the advantages thereof, the following specific examples are given, it being understood that same are intended only as illustrative and in nowise limitative.

EXAMPLE 1

The following materials were introduced into a glass reactor equipped with a stirring device:
(i) 55 parts of an α,ω-dihydroxydimethylpolysiloxane oil having a viscosity of 750 mPa.s at 25° C.;

(ii) 10 parts of an α,ω-dihydroxydimethylpolysiloxane oil having a viscosity of 100 mPa.s at 25° C.; and (iii) 35 parts of a methylpolysiloxane oil having a viscosity of 15 mPa.s at 25° C., consisting of 25% of $CH_3SiO_{1.5}$ units, 72.5% of $(CH_3)_2SiO$ units and 2.5% of $(CH_3)_3SiO_{0.5}$ units, and having 1.8% by weight of hydroxyl groups.

The entire mass was stirred for 10 minutes. 20 parts of a homogeneous mixture consisting of 5.5 parts of the silane of the formula $Si(OCH_2CH_2OCH_3)_4$, 4 parts of the silane of the formula $CH_3Si(OCH_2CH_2OCH_3)_3$, 0.5 part of the silane of the formula:

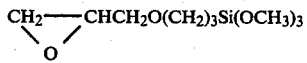

and 10 parts of a 5% strength solution of ferric acetylacetonate of the formula:

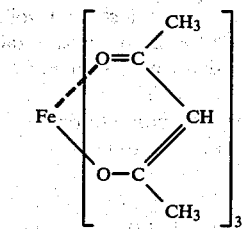

in diethylene glycol dimethyl ether of the formula:

were then added to the contents of the reactor.

The contents of the reactor were stirred for an additional 10 minutes. This resulted in the production of a clear composition which was ready to use and which had a viscosity of 400 mPa.s at 25° C. This composition was applied in a uniform layer, in an amount of 1 g/m², to one side of a Kraft paper weighing 85 g/m² (prepared from a pulp refined to 60° Shopper), which had been surface-coated with a thin barrier layer of carboxymethylcellulose and supercalendered.

The composition was deposited with the aid of a coating head of the Helioglissant type, fitted to an industrial paper-coating machine.

The deposited layer was hardened by passing the coated paper, at a speed of 180 m/minute, through a tunnel oven in the machine, heated to 175° C.; the passage time of the paper therethrough was 5 seconds.

60 g/m² of a 40% strength solution, in ethyl acetate, of an adhesive acrylic polymer marketed under the trademark SOLURON A 1030 E were deposited, by means of a pouring device, onto that side of the paper which was covered with a thin coating of hardened silicone. The paper, covered with the solution of adhesive, was placed for 3 minutes in a ventilated oven heated to 130° C., and then maintained for 15 minutes at ambient temperature. A layer of 24 g/m² of adhesive remained on the paper.

A film of polyethylene terephthalate was applied to this layer. Same was kept in place for 24 hours under a pressure of 24 g/cm². At the end of this period, the force required to separate the film from the paper was measured; the separation was carried out with the aid of a tensile tester, one of the two jaws of which was fixed, holding the paper, while the other pulled on one end of the film, bent back through an angle of 180°, at a speed of 25 cm/minute. A very low separation force was determined, namely, 2.5 g for a film width of 1 cm.

EXAMPLE 2

The following materials were introduced into a glass reactor equipped with a stirring device:

(i) 45 parts of an α,107-di(hydroxy)-methylvinylpolysiloxane oil consisting of 95% of $(CH_3)_2SiO$ units and 5% of $CH_2(CH_2=CH)SiO$ units and having a viscosity of 500 mPa.s at 25° C.;

(ii) 45 parts of a methylpolysiloxane oil having a viscosity of 75 mPa.s at 25° C., consisting of 25% of $CH_3SiO_{1.5}$ units, 72.5% of $(CH_3)_2SiO$ units and 2.5% of $(CH_3)_3SiO_{0.5}$ units and having 1.8% by weight of hydroxyl groups; and (iii) 10 parts of the silane of the formula $CH_2=CHSi(OCH_2CH_2OCH_3)_3$.

The entire mass was stirred for 20 minutes. 10 parts of a 5% strength solution of ferric acetylacetonate of the formula:

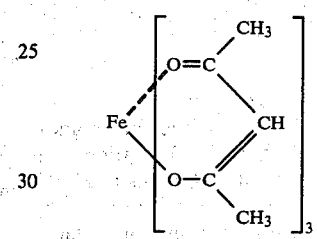

in a mixture of organic solvents were then added to the contents of the reactor, the said mixture consisting of ortho-dichlorobenzene and diethylene glycol dimethyl ether of the formula $CH_3(OCH_2CH_2)_2OCH_3$, in the weight ratio 50/50.

The contents of the reactor were stirred for 10 minutes; this resulted in the formation of a clear composition having a viscosity of 250 mPa.s at 25° C. This composition was applied in a uniform layer, in an amount of 1.2 g/m², to the glazed side of a natural-colored Kraft paper weighing 70 g/m² (prepared from a pulp refined to 45° Shopper), which had been suface-coated with a starch-based barrier layer and machine-glazed.

The composition was deposited as indicated in Example 1. The deposited layer was then hardened by passing the coated paper, at a speed of 90 m/minute, through a tunnel oven in the machine, heated to 150° C.; the passage time of the paper therethrough was 10 seconds. The non-stick character, towards adhesives, of that face of the paper which was covered with the silicone coating was then determined by following the procedure described in Example 1: depositing a layer of 24 g/m² of the acrylic adhesive, applying the film of polyethylene terephthalate to the adhesive and keeping it applied for 24 hours, and finally separating the film.

A separation force of 3.5 g was found for a film width of 1 cm.

EXAMPLE 3

The following materials were introduced into a glass reactor equipped with a stirring device:

(i) 30 parts of an α,ω-dihydroxymethylpolysiloxane oil having a viscosity of 750 mPa.s at 250° C.;

(ii) 10 parts of an α,ω-dihydroxymethylpolysiloxane oil having a viscosity of 100 mPa.s at 250° C.;

(iii) 40 parts of a methylpolysiloxane oil having a viscosity of 50 mPa.s at 25° C., consisting of 25% of $CH_3SiO_{1.5}$ units, 72.5 % of $(CH_3)_2SiO$ units and 2.5% of $(CH_3)_3SiO_{0.5}$ units and having 1.8% by weight of hydroxyl groups; and (iv) 10 parts of methylglycol silicate, $Si(-O-CH_2-CH_2-O-CH_3)_4$.

The entire mass was stirred for 20 minutes. 10 parts of a 5% strength solution of ferric acetylacetonate of the formula:

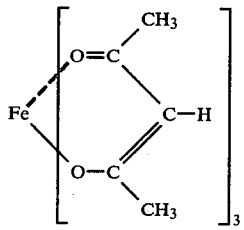

in diethylene glycol dimethyl ether

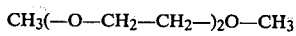

were added to the contents of the reactor.

The contents of the reactor were stirred for an additional 10 minutes. This resulted in the formation of a clear solution having a viscosity of 100 mPa.s at 25° C. and which remained stable for more than 24 hours.

This composition was used for impregnating a laminate consisting of a metal core inserted between cards of asbestos which either were or were not pretreated with resins of the phenol/formaldehyde type, epoxy type, nitrile type, or the like.

This impregnation was carried out with complete immersion in the bath for 1 minute, and was followed by draining for 1 minute and squeezing between rolls.

The polymerization was ensured by passing the coated laminate through a ventilated tunnel oven for 30 seconds at 150° C.

The gasket treated in this manner had excellent non-stick properties towards metal under the action of heat and under pressure (tested, for example, at 150° C., under 250 kg/cm², for 4 hours). Furthermore, this gasket had very good performance characteristics of water repellancy and of resistance to oils under the action of heat and under pressure (over 5 kg/cm² at 100° C.).

EXAMPLE 4

The following materials were progressively introduced into a roller mixer:

(i) 15 parts of an α,ω-dihydroxymethylpolysiloxane oil having a viscosity of 3,500 mPa.s at 25° C.; and (ii) 5 parts of "treated" aerosil pyrogenic silica having a BET specific surface area of 60 m²/g (AE 60).

After one hour of mixing, the following materials were introduced successively:

(iii) 30 parts of a methylpolysiloxane oil having a viscosity of 50 mPa.s at 25° C., consisting of 25% of $CH_3SiO_{1.5}$ units, 72.5% of $(CH_3)_2SiO$ units and 2.5% of $(CH_3)_3SiO_{0.5}$ units and having 1.8% by weight of hydroxyl groups;

(iv) 20 parts of an α,ω-dihydroxymethylpolysiloxane oil having a viscosity of 750 mPa.s at 25° C.;

(v) 10 parts of an α,ω-dihydroxymethylpolysiloxane oil having a viscosity of 100 mPa.s at 25° C.;

(vi) 6 parts of methylglycol silicate, $Si(-O-CH_2-CH_2-O-CH_3)_4$; and (vii) 4 parts of the silane methyl-trismethoxyethoxysilane, $CH_3-Si(-OC_2H_4OCH_3)_3$.

After 20 minutes of mixing, the following were added:

(viii) 10 parts of a 5% strength solution, in methyl ethyl ketone, of ferric acetylacetonate of the formula:

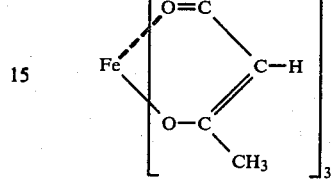

After 10 minutes of stirring, a translucent solution having a viscosity of 850 mPa.s at 25° C. was obtained.

This composition was used to lacquer a pretreated gasket, as in Example 3.

The lacquer was deposited by a conventional coating technique (a high-quality coating knife) in an amount of 30 grams/m².

The polymerization was ensured by passing the coated laminate through a ventilated tunnel oven for 30 seconds at 150° C.

The gasket treated in this manner had the properties defined in Example 3, with an elastomeric surface behavior making it possible to take up the non-uniformities in the surfaces on which it is used.

EXAMPLE 5

An experiment similar to Example 3 was carried out by preparing a composition in which the 10 parts of 5% strength solution of ferric acetylacetonate in diethylene glycol dimethyl ether were simply replaced by 10 parts of a 5% strength solution of zirconium octoate in ethylglycol acetate.

This composition was used to prepare a gasket in accordance with a process similar to that described in Example 3. The hardening was ensured by passage, for 60 seconds, through a tunnel oven heated to 150° C. This gasket has excellent non-stick properties, water-repellant properties and properties of resistance to oils under the action of heat and under pressure.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An organopolysiloxane composition comprising (i) an α,ω-dihydroxypolydiorganopolysiloxane having a viscosity, measured at 25° C., ranging from 5 to 100,000 mPa.s and consisting essentially of recurring units of the formula $Z_2SiO$, in which the symbols Z, which are identical or different, are alkyl or halogenoalkyl radicals having from 1 to 8 carbon atoms and containing from 1 to 7 chlorine and/or fluorine atoms, alkenyl radicals having from 2 to 4 carbon atoms, cycloalkyl or halogenocycloalkyl radicals having from 3 to 8 carbon atoms and containing from 1 to 4 chlorine and/or fluorine atoms, aryl, alkylaryl and halogenoaryl radicals having from 6 to 8 carbon atoms and containing from 1 to 4 chlorine and/or fluorine atoms, or cyanoalkyl radicals having from 3 to 4 carbon atoms; (ii) a polyorganopolysiloxane having from 1.60 to 1.90 organic radicals per silicon atom, having a viscosity ranging from 30 mPa.s at 25° C. to 3,000 mPa.s at 25° C., having from 0.2 to 10% of hydroxyl groups and consisting essentially of the recurring units $RSiO_{1.5}$, $R_2SiO$ and $R_3SiO_{0.5}$, in which the symbols R, which are identical or different, are alkyl or halogenoalkyl radicals having from 1 to 8 carbon atoms and containing from 1 to 7 chlorine and/or fluorine atoms, alkenyl radicals having from 2 to 4 carbon atoms, cycloalkyl or halogenocycloalkyl radicals having from 3 to 8 carbon atoms and containing from 1 to 4 chlorine and/or fluorine atoms, aryl, alkylaryl and halogenoaryl radicals having from 6 to 8 carbon atoms and containing from 1 to 4 chlorine and/or fluorine atoms, or cyanoalkyl radicals having from 3 to 4 carbon atoms; (iii) a crosslinking agent containing a polyalkoxysilyl group; and (iv) a catalytically effective amount of an organic iron or zirconium catalyst soluble in the organopolysiloxane medium.

2. The composition as defined by claim 1, wherein the organic iron or zirconium catalyst (iv) is a carboxylic acid salt, a chelate or an organometallic complex.

3. The composition as defined by claim 2, wherein the organic iron or zirconium catalyst (iv) is a chelate or an organometallic complex.

4. The composition as defined by claim 3, wherein the catalyst (iv) is an organometallic complex of iron having the formula:

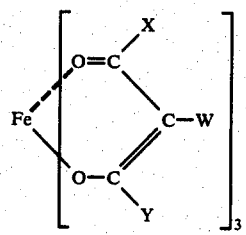

in which the symbol X is a hydrogen atom, an alkyl radical having from 1 to 4 carbon atoms, a phenyl radical, or an alkoxy radical having from 1 to 3 carbon atoms, the symbol W is a hydrogen atom, a methyl radical or an acetyl radical, and the symbol Y is a methyl radical or a phenyl radical.

5. The composition as defined by claim 1, wherein the catalyst (iv) comprises a solution thereof in an organic solvent which is compatible with the organopolysiloxane medium.

6. The composition as defined by claim 5, wherein the solvent for the catalyst (iv) is (1) a monoethylene glycol compound having the formula $TO-CH_2CH_2OT$, in which the symbols T, which are identical or different, are radicals of the formula $CH_3CO$ or methyl, ethyl, n-propyl or n-butyl radicals, (2) a diethylene glycol compound having the formula $T'O(CH_2CH_2O)T'$, in which the symbols T', which are identical or different, are radicals of the formula $CH_3CO$ or methyl or ethyl radicals, with the proviso that the symbols T' cannot both be $CH_3CO$, and said compound (2) being liquid at ambient temperature, or (3) an aromatic hydrocarbon having the formula:

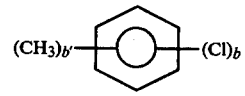

in which the symbol b represents 1 or 2 and the symbol b' represents zero or 1.

7. The composition as defined by claim 1, wherein the polydiorganopolysiloxane (i) consists essentially of recurring units of the formula $Z_2SiO$, in which the symbols Z, which are identical or different, are methyl, ethyl, n-propyl, vinyl or phenyl radicals, at least 85% of such radicals being methyl radicals, at most 10% of such radicals being phenyl radicals and at most 5% of such radicals being vinyl radicals; and wherein the polyorganopolysiloxane (ii) the symbols R are methyl, ethyl, n-propyl or vinyl radicals, at least 90% of such radicals being methyl radicals and at most 5% of such radicals being vinyl radicals.

8. The composition as defined by claim 1, comprising 100 parts of the diorganopolysiloxane (i), 30 to 120 parts of the organopolysiloxane (ii), 8 to 35 parts of the crosslinking agent (iii), and 6 to 40 parts of the catalyst (iv) which comprises a solution containing from 1 to 10% weight/weight of said organic iron or zirconium catalyst in a solvent which is compatible with the polysiloxane medium.

9. The composition as defined by claim 1, further comprising an epoxysilane having the formula:

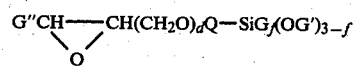

or the formula

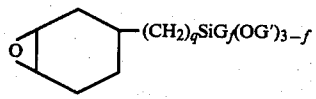

in which the symbols G are methyl, ethyl, n-propyl or n-butyl radicals or phenyl radicals, the symbols G' are methyl, ethyl, n-propyl or isopropyl radicals or β-methoxyethyl radicals, the symbol G'' is a hydrogen atom or a methyl, ethyl or n-propyl radical, the symbol Q is an alkylene radical having from 1 to 10 carbon atoms, the symbols f are 0 or 1, the symbol g is zero or 2 and the symbol d is zero or 1.

10. The composition as defined by claim 1, further comprising an α,ω-bis-(trioganosiloxy)diorganopolysiloxane oil having a voscosity ranging from 0.5 to 200 mPa.s at 25° C.

11. The composition as defined by claim 1, further comprising a filler.

12. A substrate coated with the composition as defined by claim 1.

13. The coated substrate as defined by claim 12, said substrate comprising asbestos.

14. The coated substrate as defined by claim 12, said substrate comprising a cellulosic.

15. The coated substrate as defined by claim 12, said substrate comprising a synthetic organic polymer.

16. The coated substrate as defined by any of claims 12 to 15, said coating composition being crosslinked.

* * * * *

UNITED STATES PATENT AND TRADEMARK OFFICE
CERTIFICATE OF CORRECTION

PATENT NO. : 4,404,348

DATED : September 13, 1983

INVENTOR(S) : ALAIN FAU et al

It is certified that error appears in the above-identified patent and that said Letters Patent is hereby corrected as shown below:

Column 14, line 7, change "107" to read -- $\omega$ --;

Claim 9, column 18, line 40, change "q" to read -- "g" --;

Claim 10, column 18, line 53, change "trioganosiloxy" to read -- triorganosiloxy --;

Claim 10, column 18, line 54, change "voscosity" to read -- viscosity --.

Signed and Sealed this

Fifth Day of June 1984

[SEAL]

Attest:

GERALD J. MOSSINGHOFF

Attesting Officer

Commissioner of Patents and Trademarks